(12) United States Patent
Hamada

(10) Patent No.: US 12,418,032 B2
(45) Date of Patent: Sep. 16, 2025

(54) CATALYST INK FOR FORMING ELECTRODE CATALYST LAYER AND METHOD OF PRODUCING MEMBRANE ELECTRODE ASSEMBLY

(71) Applicant: TOPPAN INC., Tokyo (JP)

(72) Inventor: Naoki Hamada, Tokyo (JP)

(73) Assignee: TOPPAN INC., Tokyo (JP)

( * ) Notice: Subject to any disclaimer, the term of this patent is extended or adjusted under 35 U.S.C. 154(b) by 641 days.

(21) Appl. No.: 17/830,585

(22) Filed: Jun. 2, 2022

(65) Prior Publication Data
US 2022/0302465 A1    Sep. 22, 2022

Related U.S. Application Data

(63) Continuation of application No. PCT/JP2020/044388, filed on Nov. 27, 2020.

(30) Foreign Application Priority Data

Dec. 9, 2019 (JP) .................. 2019-222431

(51) Int. Cl.
*H01M 4/88* (2006.01)
*H01M 4/86* (2006.01)
(Continued)

(52) U.S. Cl.
CPC ....... *H01M 4/8828* (2013.01); *H01M 4/8652* (2013.01); *H01M 4/8663* (2013.01);
(Continued)

(58) Field of Classification Search
None
See application file for complete search history.

(56) References Cited

U.S. PATENT DOCUMENTS

2005/0181270 A1    8/2005  Sugiura

FOREIGN PATENT DOCUMENTS

EP    3 694 037 A1    8/2020
JP    2007-220416 A   8/2007
(Continued)

OTHER PUBLICATIONS

International Search Report Issued in International Application No. PCT/JP2020/044388 dated Jan. 19, 2021, 6 pages.
(Continued)

*Primary Examiner* — Jonathan Crepeau
(74) *Attorney, Agent, or Firm* — Foley & Lardner LLP

(57) ABSTRACT

A catalyst ink which can be directly applied to a polymer electrolyte membrane without producing wrinkles or cracks in the catalyst layer and without lowering performance, and a membrane electrode assembly using the catalyst ink. The catalyst ink for an electrode catalyst layer includes a solvent. The solvent contains catalyst-supported carbon particles which are carbon particles supporting a catalyst, a polymer electrolyte, and at least one of carbon fibers and organic electrolyte fibers. The solvent has a particle size distribution which a first peak lies in a range of 0.1 μm or more and 1 μm or less, and a second peak lies in a range of 1 μm or more and 10 μm or less. The catalyst ink is directly applied to a polymer electrolyte membrane to produce a membrane electrode assembly.

6 Claims, 2 Drawing Sheets

(51) Int. Cl.
*H01M 4/90* (2006.01)
*H01M 4/92* (2006.01)

(52) U.S. Cl.
CPC ....... *H01M 4/8668* (2013.01); *H01M 4/8673* (2013.01); *H01M 4/881* (2013.01); *H01M 4/9083* (2013.01); *H01M 4/926* (2013.01)

(56) References Cited

FOREIGN PATENT DOCUMENTS

| | | | |
|---|---|---|---|
| JP | 2016100254 | * | 5/2016 |
| JP | 2017-018909 A | | 1/2017 |
| WO | WO-02/27844 A1 | | 4/2002 |
| WO | WO-2019/069789 A1 | | 4/2019 |

OTHER PUBLICATIONS

International Searching Authority, "Written Opinion," issued in connection with International Patent Application No. PCT/JP2020/044388, dated Jan. 19, 2021, 3 pages.
European Extended Search Report issued in corresponding European Patent Application No. 20898969.9 dated Jun. 24, 2024 (9 pages).
Office Action issued in corresponding Chinese Patent Application No. 202080082948.X dated Mar. 7, 2025.

* cited by examiner

CATALYST INK FOR FORMING ELECTRODE CATALYST LAYER AND METHOD OF PRODUCING MEMBRANE ELECTRODE ASSEMBLY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/044388, filed on Nov. 27, 2020, which in turn claims the benefit of JP 2019-222431, filed Dec. 9, 2019, the disclosures of which are incorporated herein by reference in its entirety.

TECHNICAL FIELD

The present invention relates to a catalyst ink for forming an electrode catalyst layer of a polymer electrolyte fuel cell and a method of producing a membrane electrode assembly using the catalyst ink.

BACKGROUND

A solid polymer fuel cell has a structure in which a polymer electrolyte membrane is sandwiched between a cathode electrode catalyst layer and an anode electrode catalyst layer. Polymer electrolyte fuel cells with such a structure are expected to be used as power sources for automobiles and stationary power sources because of their advantages of operating at room temperature and short start-up time.

As a method for producing a membrane electrode assembly, a method of applying the catalytic ink directly to the polymer electrolyte membrane to form the membrane electrode assembly, or a method of applying the catalyst ink to a transfer substrate or a gas diffusion layer and then thermally bonding to the polymer electrolyte membrane to form the membrane electrode assembly has been known. The catalyst ink comprises, for example, carbon particles supporting a catalyst, a polymer electrolyte and a solvent.

Among them, the method of producing a membrane electrode assembly by directly applying catalytic ink to the polymer membrane is characterized in that the adhesion of the interface between the polymer electrolyte membrane and the electrode catalyst layer is good and the catalyst layer is not crushed by thermocompression bonding. Therefore, the use of this method of producing a membrane electrode assembly makes it possible to produce membrane electrode assembly having excellent power generation performance and durability.

However, the conventional production method of applying the catalyst ink directly to the electrolyte membrane encounters a risk that application of the catalyst ink to the electrolyte membrane causes the solvent in the ink to be a factor leading to swelling or shrinking of the polymer electrolyte membrane, and can lead to occurrence of wrinkles or cracks in the formed catalyst layer.

To solve the above issues, Patent Literature 1 discloses that the catalyst layer can be formed directly on an electrolyte membrane using an acicular carbon material such as carbon nanotubes for the electrode catalyst layer.

The use of this method, however, may result in lower power generation performance due to low catalyst utilization. Further, the acicular carbon material such as carbon nanotubes is bulky, and entanglement of the acicular carbon material can make the catalyst ink highly viscous, which may make application difficult.

Patent Literature 2 discloses that the performance is improved by producing an electrode catalyst layer made of a fibrous proton-conductive material as a major element. However, although this method improves performance, it may not provide enough film strength to suppress occurrence of wrinkles or cracks in the catalyst layer when applied directly to the electrolyte membrane.

CITATION LIST

[Patent Literature] [PTL 1] WO 2002/027844; [PTL 2] JP 2007-220416 A.

SUMMARY OF THE INVENTION

Technical Problem

The present invention has been made in view of the above points and aims to provide a catalytic ink and a membrane electrode assembly using the catalytic ink that can be directly applied to a polymer electrolyte membrane without causing wrinkles or cracks and without degrading the performance.

Solution to Problem

In order to solve the above problem, a catalyst ink for an electrode catalyst layer according to an aspect of the present invention includes a solvent. The solvent contains catalyst-supported carbon particles which include carbon particles supporting a catalyst, and a polymer electrolyte, and at least one selected from carbon fibers and organic electrolyte fibers. The solvent has a particle size distribution in which a first peak lies in a range of 0.1 µm or more and 1 µm or less, and a second peak lies in a range of 1 µm or more and 10 µm or less.

An aspect of the present invention is in a method of producing a membrane electrode assembly in which catalyst ink is directly applied to a polymer electrolyte membrane to produce a membrane electrode assembly, and the catalyst ink for an electrode catalyst layer having the above configuration is used as the catalyst ink.

Advantageous Effects of the Invention

The use of the catalyst ink according to the aspect of the present invention enhances the film strength due to entanglement of the carbon fibers and the organic electrolyte fibers, and suppresses wrinkles or cracks even when the catalyst ink is directly applied to the electrolyte film. Further, the use of the catalyst ink according to the aspect of the present invention imparts electronic conductivity to the carbon fibers, and imparts proton conductivity to the organic electrolyte fibers, thereby reducing degradation of performance.

As a result, according to the aspect of the present invention, even when the catalyst ink is directly applied to the polymer electrolyte membrane during the production of the membrane electrode assembly, occurrence of wrinkles or cracks in the catalyst layer can be suppressed without reducing the power generation performance.

DETAILED DESCRIPTION

Description of the Embodiments

Figure 1:
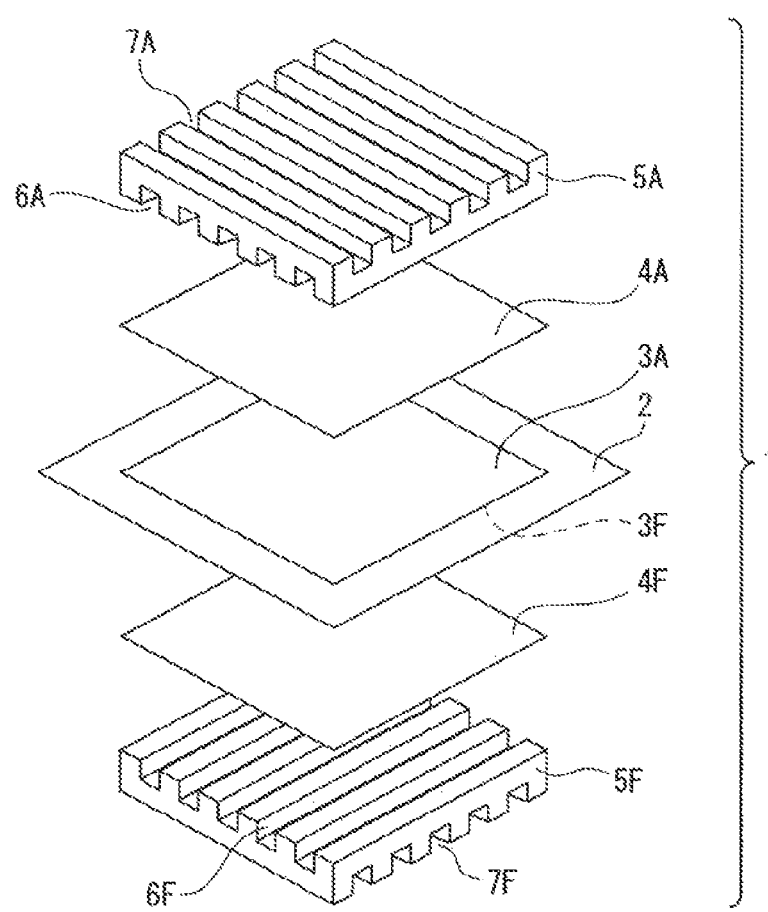
FIG. 1 is an exploded perspective view of an internal structure of a polymer electrolyte fuel cell according to an embodiment of the present invention.

Referring to the drawings, some embodiments of the present invention will be described.

It should be noted that the present invention is not limited to the embodiments described below but may be modified in design or the like based on the knowledge of a skilled person, and such modifications are also encompassed by the scope of the present invention.

In the following detailed description, specific details will be explained to provide a complete understanding of the embodiments of the present invention. It is clear, however, that one or more embodiments can be implemented without such details. To simplify the drawings, well-known structures and devices may be schematically illustrated.

[Configuration of Polymer Electrolyte Fuel Cell]

As shown in FIG. 1, a pair of electrode catalyst layers 3A and 3F facing each other across the polymer electrolyte membrane 2 are arranged on both surfaces of the polymer electrolyte membrane 2 constituting the solid polymer fuel cell 1. A gas diffusion layer 4A is disposed on the surface of the electrode catalyst layer 3A opposite to the surface facing the polymer electrolyte membrane 2, and a gas diffusion layer 4F is arranged on the surface of the electrode catalyst layer 3F opposite to the surface facing the polymer electrolyte membrane 2 so that the gas diffusion layer 4A and the gas diffusion layer 4F face each other across the polymer electrolyte membrane 2 and the pair of electrode catalyst layers 3A and 3F.

The gas diffusion layer 4A has a first surface and a second surface opposed to the first surface. The first surface faces the electrode catalyst layer 3A. A separator 5A has a first major surface and a second major surface. The first major surface faces the second surface of the gas diffusion layer 4A and has formed therein gas flow paths 6A through which reaction gas flows. The second major surface has formed therein cooling water paths 7A through which cooling water passes. The separator 5A is disposed at the first major surface thereof on the second surface of the gas diffusion layer 4A. The gas diffusion layer 4F has a first surface and a second surface opposed to the first surface. The first surface faces the electrode catalyst layer 3F. A separator 5F has a first major surface and a second major surface. The first major surface faces the second surface of the gas diffusion layer 4F and has formed therein gas flow paths 6F through which reaction gas flows. The second major surface has formed therein cooling water paths 7F through which cooling water passes. The separator 5F is disposed at the first major surface thereof on the second surface of the gas diffusion layer 4F. Hereinafter, the electrode catalyst layers 3A and 3F may be simply referred to as the "electrode catalyst layer 3" when there is no need to distinguish between the two layers.

Figure 2:
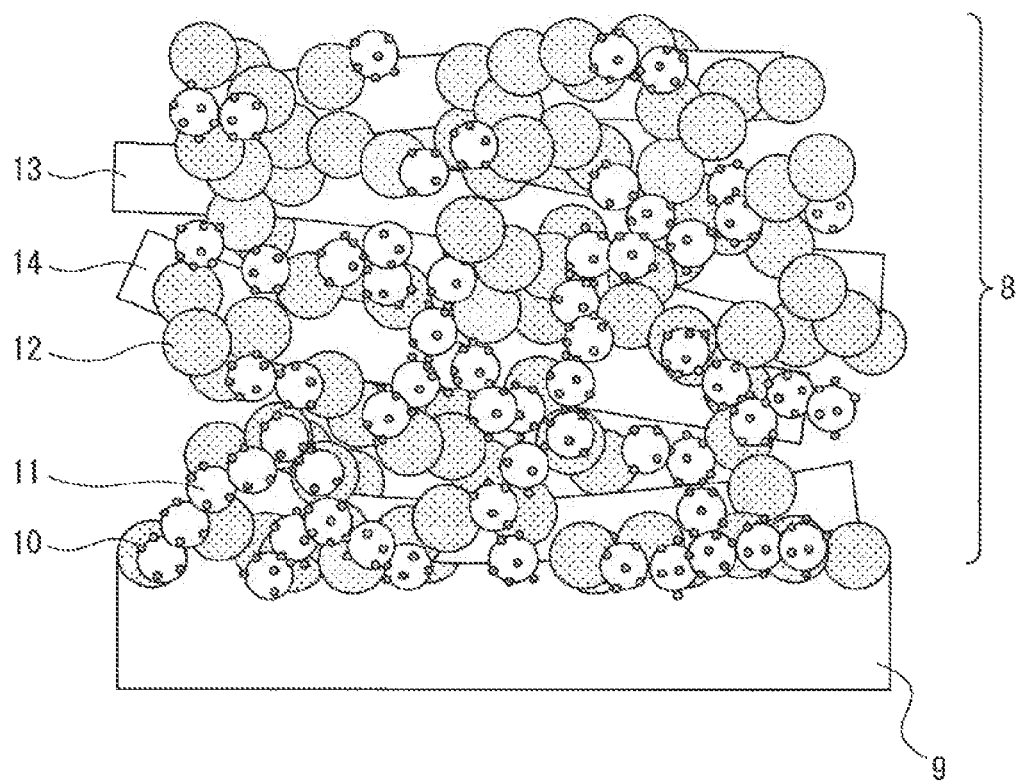
FIG. 2 is a view for describing a structure of a membrane electrode assembly for a polymer electrolyte fuel cell according to an embodiment of the present invention.

FIG. 2 is a schematic cross-sectional view showing an example of a configuration of the electrode catalyst layer according to the present embodiment. As shown in FIG. 2, the electrode catalyst layer 8 according to the present embodiment is bonded to the surface of the polymer electrolyte membrane 9. The electrode catalyst layer 8 is composed of a catalyst 10, carbon particles 11 as a conductive carrier, a polymer electrolyte 12, carbon fibers 13, and organic electrolyte fibers 14. Portions of the electrode catalyst layer 8 where none of the catalyst 10, the carbon particles 11, the polymer electrolyte 12, the carbon fiber 13, and the organic electrolyte fiber 14 are present are voids.

[Preparation of Catalyst Ink]

Next, a method of producing catalyst ink for forming electrode catalyst layer according to the present embodiment will be described. The catalyst ink for forming the electrode catalyst layer is used for forming the electrode catalyst layers 3 and 8 (electrode catalyst layer for the solid polymer fuel cell) of the solid polymer fuel cell 1.

First, to obtain a catalyst particle slurry, the carbon particles 11 forming the catalyst-supported carbon particles carrying the catalyst 10 and the polymer electrolyte 12 are mixed and dispersed in a dispersion medium (in a solvent).

Examples of the catalyst 10 include metals and alloys of the following metals, and oxides, complex oxides, and carbides of these substances. Examples of metals include platinum group elements (platinum, palladium, ruthenium, iridium, rhodium, and osmium), iron, lead, copper, chromium, cobalt, nickel, manganese, vanadium, molybdenum, gallium, and aluminum.

The carbon particles 11 may be any type as long as they are conductive and can carry a catalyst without being affected by the catalyst. However, generally, carbon particles are used.

As a dispersion medium (solvent), any one of water or alcohols such as methanol, ethanol, 1-propanol, 2-propanol, 1-butanol, 2-butanol, isobutyl alcohol, tert-butyl alcohol, and pentanol can be used. Further, as the dispersion medium, it is also possible to use a dispersion medium in which two or more of the above dispersion mediums are mixed. For mixing and dispersing, for example, bead mills, planetary mixers, and dissolvers can be used.

Any material can be used for the polymer electrolyte membranes 2 and 9 and the polymer electrolyte 12, as long as the material has proton conductivity, and fluorine-based polymer electrolytes and hydrocarbon-based polymer electrolytes can be used. A polymer electrolyte having a tetrafluoroethylene skeleton can be used as the fluorine-based polymer electrolyte. For example, "Nafion (registered trademark)" manufactured by Du Pont may be used. The polymer electrolyte 12 is in a state where the polymer electrolyte is aggregated.

Next, at least one of the carbon fibers 13 and organic electrolyte fibers 14 is added to the catalyst particle slurry produced by the above method, and mixed and dispersed to obtain a catalyst ink. For mixing and dispersing, for example, bead mills, planetary mixers, and dissolvers can be used.

Examples of the carbon fiber 13 include carbon fibers, carbon nanotubes, carbon nanohorns, and conductive polymer nanofibers. Only one type of these fibers may be used alone, or two or more types of fibers may be used together.

The polymer electrolyte 12 and the polymer electrolyte constituting the organic electrolyte fiber 14 may be formed from the same material or material different from each other. The polymer electrolyte constituting each of the polymer electrolyte 12 and the organic electrolyte fiber 14 and the polymer electrolyte constituting the polymer electrolyte films 2 and 9 may be the same or different from each other.

(Production of Membrane Electrode Assembly)

The membrane electrode assembly is produced by bonding the electrode catalyst layer 3 formed of the catalyst ink to both surfaces of the polymer electrolyte membrane 2.

Examples of a method of bonding the electrode catalyst layer 3 to the polymer electrolyte membrane 2 include bonding the electrode catalyst layer 3 and the polymer electrolyte membrane 2 by using a transfer substrate having an electrode catalyst layer in which a catalyst ink is applied to the transfer substrate, and to bring the surface of the electrode catalyst layer of the transfer substrate into contact with the electrode catalyst layer having the polymer electrolyte membrane, and then heat and pressure the electrode catalyst layer 3 and the polymer electrolyte membrane 2.

However, the use of the above method results in poor adhesion between the electrode catalyst layer 3 and the polymer electrolyte membrane 2, and voids are likely to be formed at the interface between the electrode catalyst layer 3 and the polymer electrolyte membrane 2. This tends to cause problems such as a decrease in power generation performance due to interfacial resistance, and a decrease in power generation performance due to flooding due to water clogging of the void.

On the other hand, the film electrode assembly can also be produced by a method in which a solvent component (dispersion medium) is removed from the coating film of the catalyst ink after the catalyst ink is directly applied to the surface of the polymer electrolyte membrane 2. The use of this method is unlikely to cause the above problems because of the good adhesion between the electrode catalyst layer 3 and the polymer electrolyte membrane 2.

However, the conventional method of applying the catalytic ink directly to the polymer electrolyte membrane 2 has the problem that wrinkles or cracks can easily occur in the applied electrode catalyst layer 3 due to the swelling of the polymer electrolyte membrane 2, which can lead to a decrease in power generation performance and durability.

On the other hand, if at least one of the carbon fibers 13 and the organic electrolyte fibers 14 is added to the catalyst ink as in the present embodiment, the strength of the electrode catalyst layer 3 is enhanced. Specifically, the catalyst ink comprising only catalyst-supported carbon particles having a particle diameter in the range of 0.1 μm or more and 1 μm or less undergo aggregation because the catalyst-supported carbon particles are small, and tends to cause wrinkles or cracks in the coated electrode catalyst layer 3. Therefore, the present embodiment contributes to the suppression of wrinkles or cracks in the electrode catalyst layer 3, because aggregation of the catalyst-supported carbon particles having a small particle diameter can be suppressed by adding the above fibers 13 having a particle diameter in a range of 1 μm or more and 10 μm or less.

If a peak in the range of 0.1 μm or more and 1 μm or less is outside the range of 0.1 μm or more and 1 μm or less in the particle size distribution in the catalyst ink, aggregation cannot be fully controlled, and thus wrinkles or cracks are likely to occur in the coated electrode catalyst layer 3.

Additionally, if the peak in the range of 1 μm or more and 10 μm or less in the particle size distribution in the catalyst ink is larger than this range, when the coating is applied so that the film becomes thin, the unevenness becomes conspicuous, which may cause damage to the polymer electrolyte membrane 2.

On the other hand, a catalytic ink consisting only of large particle diameters in the range of 1 μm or more and 10 μm or less will have insufficient specific surface area of the catalyst, resulting in a decrease in the catalytic activity and therefore leading to lower performance.

If the viscosity of the catalytic ink is high, the coating and drying process becomes difficult, and wrinkles or cracks are likely to occur in the electrode catalyst layer 3 during the coating and drying process. Specifically, when the thixotropic index (TI value) of the viscosity at a shear rate of 10 (1/s) to the viscosity at a shear rate of 100 (1/s) exceeds 10, coating becomes difficult and wrinkles or cracks are likely to occur. A catalytic ink consisting only of small particle diameters tends to cause agglomeration of particles, and as a result, the TI value becomes high. On the other hand, the catalyst ink formed of small particles having a peak value of the particle size distribution in the range of 0.1 μm to 1 μm and large particles having a peak value of the particle size distribution in the range of 1 μm to 10 μm suppresses agglomeration of the particles and therefore does not have high viscosity, and is less likely to cause wrinkles or cracks when applied to the electrode catalyst layer 3.

In the catalyst ink of the present embodiment, as described above, the catalyst-supported carbon particles have a peak value of the particle size distribution in the range of 0.1 μm to 1 μm, and the added fibers form a peak value of the particle size distribution in the range of 1 μm to 10 μm. Each of the above peak values can be formed, for example, if the particle size of the target particle is 60 wt % or more, preferably 80 wt % or more, within the relevant range, respectively.

When the solid content concentration of the catalyst ink is higher than 20 wt %, the viscosity becomes high and it becomes difficult to apply a thin film thickness, so that wrinkles or cracks are easily generated when applied to the electrode catalyst layer 3.

On the other hand, when the viscosity of the catalyst ink is low, specifically, when the thixotropic index (TI value) of a viscosity at a shear rate of 10 (1/s) to a viscosity at a shear rate of 100 (1/s) becomes smaller than 1.5, wrinkles or cracks are likely to occur during the drying process of the catalyst ink when the catalyst ink is applied to the electrode catalyst layer 3.

The average fiber diameter of the organic electrolyte fiber 14 is 2 μm or less. When the average fiber diameter is 2 μm or less, appropriate thinness for a fiber material contained in the electrode catalyst layer can be ensured.

In order to improve the output of the polymer electrolyte fuel cell, it is desired that the gas supplied to the electrode catalyst layer is suitably diffused into the electrode catalyst layer through the void in the electrode catalyst layer, and that the water generated through the electrode reaction is appropriately discharged through the void, particularly in the air electrode. The presence of the void facilitates the formation of the interface between the gas, the catalyst-supported carbon particles and the polymer electrolyte, and promotes the electrode reaction, thereby improving the output of the solid polymer fuel cell.

From the above viewpoints, the electrode catalyst layer preferably has the void of an appropriate size and amount. When the average fiber diameter of the polymer electrolyte fibers 14 is 2 μm or less, sufficient gaps are formed in the structure in which the polymer electrolyte fibers 14 are entangled with each other in the electrode catalyst layer, and thus sufficient quantity of voids is ensured. Accordingly, the output of the fuel cell can be improved. Further, when the average fiber diameter of the polymer electrolyte fibers 14 is in the range of 0.5 nm or more and 500 nm or less, the output of the fuel cell is particularly increased.

The average fiber length of the polymer electrolyte fibers 14 is preferably larger than the average fiber diameter and preferably in the range of 1 μm or more and 200 μm or less. When the average fiber length is within the above range, aggregation of the polymer electrolyte fibers 14 in the electrode catalyst layer is reduced, which facilitates void formation. Further, when the average fiber length is within the above range, since a structure in which the polymer electrolyte fibers 14 are entangled with each other in the electrode catalyst layer is suitably formed, the electrode catalyst layer has increased strength. Accordingly, the effect of reducing occurrence of cracking is further enhanced.

Advantageous Effects of the Present Embodiment

According to the present embodiment, even when the catalyst ink is directly applied to the polymer electrolyte membrane during the production of the membrane electrode assembly, wrinkles or cracks in the catalyst layer can be suppressed without degrading the power generation performance. As a result, it is possible to produce a membrane electrode assembly having good power generation performance without lowering the yield.

Examples and comparative examples of the present invention will now be described.

Example 1

Example 1 of the present invention will be described below.

[Preparation of Catalyst Ink]

Catalyst-supported carbon particles (trade name: TEC10E50E, manufactured by TANAKA Kikinzoku Kogyo K.K.) supporting 50 wt % platinum and a dispersion of polymer electrolyte (trade name: Nafion dispersion, manufactured by FUJIFILM Wako Pure Chemical Corporation) were mixed with water in a planetary mixer to prepare a catalyst particle slurry.

Carbon fibers (Trade name: VGCF-H, manufactured by Showa Denko K.K.) and 1-propanol were added to the above catalyst particle slurry, adjusted to a solid content concentration of 10 wt %, and dispersed by a bead mill disperser to obtain a catalyst ink.

Figure 3:
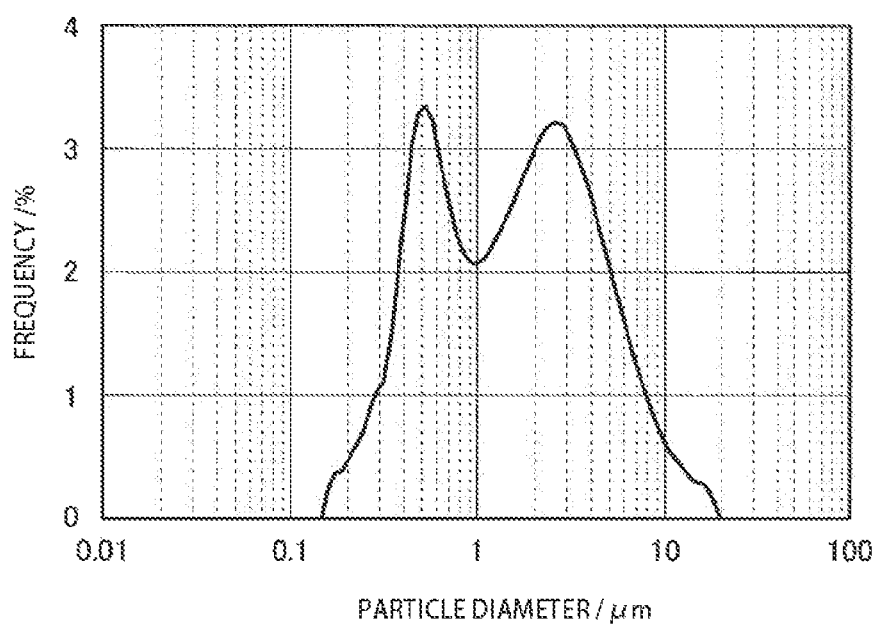
FIG. 3 is a diagram showing a measurement result of a particle size distribution of catalyst ink according to an embodiment of the present invention.

The measurement result of the particle size distribution of the catalyst ink was as shown in FIG. 3, that is, the catalyst ink of Example 1 was a catalyst ink having a particle size distribution having a peak in the range of 0.1 μm to 1 μm and a peak in the range of 1 μm to 10 μm.

The catalyst ink of Example 1 had a TI value of 6.0 as a result of measuring the ratio of the viscosity at a shear rate of 10 (1/s) and the viscosity at a shear rate of 100 (1/s).

<Measurement of Particle Size Distribution>

Here, the measurement of the particle size distribution in the catalyst ink of the present specification is performed by the laser diffraction and scattering method.

The measurement conditions were as follows:
Measurement conditions:
Permeability of sample: Absorbed
Refractive index of solvent: 1.333
<Measurement of Shear rate>
The measurement of the shear rate (viscosity measuring method) of the present specification is performed under the following conditions.
Measurement conditions:
Measuring device: Cone plate type viscometer
Measurement range (shear rate): 1000 [1/s] to 1 [1/s]
Measurement temperature: 23° C.

<TI value>
The TI value is the ratio of viscosity.
The TI values in the present specification are defined as follows.

$$TI\ value = \text{Viscosity at a shear rate of 10 [1/sec]/Viscosity at a shear rate of 100 [1/sec]}$$

(Production of Membrane Electrode Assembly)

Next, the catalyst ink was directly applied to both surfaces of the polymer electrolyte membrane by the die coating method to obtain a membrane electrode assembly.

The catalyst ink of Example 1 did not cause wrinkles or cracks in the catalyst layer when directly applied to both surfaces of the polymer electrolyte membrane, and obtained good power generation performance.

Example 2

Example 2 of the present invention will be described below.

The catalyst ink of Example 2 was obtained by a process similar to that of Example 1, except that polymer electrolyte fibers were added to the catalyst ink instead of carbon fibers.

Polymer electrolyte fibers were prepared by forming a polymer electrolyte dispersion (Nafion dispersion: manufactured by FUJIFILM Wako Pure Chemical Corporation) into a fibrous state using the electrospinning method, followed by cooling and pulverizing. The average fiber diameter of the polymer electrolyte fibers was 150 nm and the average fiber length was 10 μm.

The measurement result of the particle size distribution of the catalyst ink of Example 2 showed two peaks, one of which is a peak in a range of 0.1 μm to 1 μm and the other a peak in a range of 1 μm to 10 μm.

The catalyst ink of Example 2 had a TI value of 7.5 as a result of measuring the ratio of the viscosity at a shear rate of 10 (1/s) and the viscosity at a shear rate of 100 (1/s).

The catalyst ink of Example 2 did not cause wrinkles or cracks in the catalyst layer when directly applied to both surfaces of the polymer electrolyte membrane, and obtained good power generation performance.

Example 3

Example 3 of the present invention will be described below.

The catalyst ink of Example 3 was obtained by a process similar to that of Example 1, except that the polymer electrolyte fibers of Example 2 were added after the carbon fibers of Example 1 was added.

The measurement result of the particle size distribution of the catalyst ink of Example 3 showed a peak in a range of 0.1 μm to 1 μm and a peak in a range of 1 μm to 10 μm.

The catalyst ink of Example 3 had a TI value of 4.5 as a result of measuring the ratio of the viscosity at a shear rate of 10 (1/s) and the viscosity at a shear rate of 100 (1/s).

The catalyst ink of Example 3 did not cause wrinkles or cracks in the catalyst layer when directly applied to both surfaces of the polymer electrolyte membrane, and obtained good power generation performance.

Comparative Example 1

The catalyst ink of Comparative Example 1 was obtained by a process similar to that of Example 1, except that no carbon fibers were added to the catalyst ink.

In the measurement result of the particle size distribution of the catalyst ink of Comparative Example 1, one peak in the range of 0.1 μm to 1 μm appeared.

The catalyst ink of Comparative Example 1 had a TI value of 11.0 as a result of measuring the ratio of the viscosity at a shear rate of 10 (1/s) and the viscosity at a shear rate of 100 (1/s).

The catalyst ink of Comparative Example 1 resulted in the occurrence of wrinkles or cracks in the catalyst layer when directly applied to both surfaces of the polymer electrolyte membrane.

Comparative Example 2

The catalyst ink of Comparative Example 2 was obtained by a process similar to that of Example 1, except that the catalyst ink was produced so that the solid content concentration was 5 wt %.

The measurement result of the particle size distribution of the catalyst ink of Comparative Example 2 showed two peaks, one of which is a peak in a range of 0.1 μm to 1 μm and the other a peak in a range of 1 μm to 10 μm.

The catalyst ink of Comparative Example 2 had a TI value of 1.0 as a result of measuring the ratio of the viscosity at a shear rate of 10 (1/s) and the viscosity at a shear rate of 100 (1/s).

The catalyst ink of Comparative Example 2 resulted in the occurrence of wrinkles or cracks in the catalyst layer when directly applied to both surfaces of the polymer electrolyte membrane.

Comparative Example 3

A catalyst ink of Comparative Example 2 were obtained in the process similar to that of Example 3, except that polymer electrolyte fibers having an average fiber diameter of 3.0 μm and an average fiber length of 20 μm were used as the polymer electrolyte fibers.

The measurement result of the particle size distribution of the catalyst ink of Comparative Example 3 showed two peaks, one of which is a peak in a range of 0.1 μm to 1 μm and the other a peak in a range of 1 μm to 10 μm.

The above-described catalyst ink had a TI value of 6.0 as a result of measuring the ratio of the viscosity at a shear rate of 10 (1/s) and the viscosity at a shear rate of 100 (1/s).

The catalyst ink of Comparative Example 3 did not cause wrinkles or cracks in the catalyst layer when directly applied to both surfaces of the polymer electrolyte membrane, but resulted in a slight decrease in power generation performance.

The scope of the present invention is not limited to the illustrated and described exemplary embodiments, but includes all embodiments that provide effects equivalent to the intended effects of the present invention. Furthermore, the scope of the present invention is not limited to combinations of features recited in the claims, but may be defined by any desired combination of specific features among all the disclosed features.

This application claims the benefit of priority from Japanese Patent Application No. 2019-222431 (filed on Dec. 9, 2019), the entirety of which is incorporated herein by reference.

REFERENCE SIGNS LIST

1 . . . Polymer electrolyte fuel cell; 2, 9 . . . Polymer electrolyte membrane; 3, 8 . . . Electrode catalyst layer; 3A, 3F . . . Electrode catalyst layer; 10 . . . Catalyst; 11 . . . Carbon particle; 12 . . . Polymer electrolyte; 13 . . . Carbon fiber; 14 . . . organic electrolyte fiber.

What is claimed is:

1. A catalyst ink for forming an electrode catalyst layer, comprising:
   a solvent which contains catalyst-supported carbon particles which include carbon particles supporting a catalyst, a polymer electrolyte, and at least one selected from carbon fibers and organic electrolyte fibers, wherein
   the solvent has a particle size distribution in which a first peak corresponding to the catalyst-supported carbon particles lies in a range of 0.1 μm or more and 1 μm or less, and a second peak corresponding to the at least one selected from the carbon fibers and the organic electrolyte fibers lies in a range of 1 μm or more and 10 μm or less,
   a concentration of a solid content in the ink is 8 wt % or more and 20 wt % or less, and
   the ink has a thixotropic index (TI value) of a first viscosity at a shear rate of 10 (1/s) to a second viscosity at a shear rate of 100 (1/s) of 1.5 or more and 10 or less.

2. The catalyst ink for forming an electrode catalyst layer of claim 1, wherein the catalyst ink contains one or more kinds selected from carbon nanofibers and carbon nanotubes as the carbon fibers.

3. The catalyst ink of claim 1, wherein the catalyst ink contains the organic electrolyte fibers, the organic electrolyte fibers have an average fiber diameter of 2 μm or less, and an average fiber length of 1 μm or more and 200 μm or less.

4. A membrane electrode assembly using the catalyst ink for forming an electrode catalyst layer of claim 1.

5. A method of producing a membrane electrode assembly in which a catalyst ink is directly applied to a polymer electrolyte membrane to produce the membrane electrode assembly, wherein
   the catalyst ink for forming an electrode catalyst layer of claim 1 is used as the catalyst ink.

6. The catalyst ink of claim 1, wherein the TI value of the ink is from 4.5 to 7.5.

* * * * *